United States Patent [19]

Lazzouni et al.

[11] Patent Number: 5,460,646
[45] Date of Patent: Oct. 24, 1995

[54] INFRARED PRINTING INK AND METHOD OF MAKING SAME

[75] Inventors: Mohamed Lazzouni; Mohamed Yousaf, both of Worcester, Mass.

[73] Assignee: SIA Technology Corporation, Southboro, Mass.

[21] Appl. No.: 337,991

[22] Filed: Nov. 10, 1994

[51] Int. Cl.$^6$ .................................................. C09D 11/02
[52] U.S. Cl. ...................... 106/21 R; 106/21 A; 106/410
[58] Field of Search ............................ 106/21 R, 21 D, 106/410

[56] References Cited

U.S. PATENT DOCUMENTS

| | | | |
|---|---|---|---|
| 3,759,947 | 9/1973 | Pugin et al. | 106/410 |
| 5,093,147 | 3/1992 | Andrus et al. | 427/7 |

FOREIGN PATENT DOCUMENTS

| | | | |
|---|---|---|---|
| 0313943 | 5/1989 | European Pat. Off. | C09B 47/04 |
| 0344891 | 12/1989 | European Pat. Off. | C09B 47/04 |
| 63-309568 | 12/1988 | Japan | C09D 11/02 |

OTHER PUBLICATIONS

*A Silicon Phthalocyanine and a Silicon Naphthalocyanine: Synthesis Electrochemistry, and Electrogenerated Chemiluminescence*, Wheeler B. L., et al., J. Am. Chem. Soc. 1984, 106, pp. 7404–7410.

*Synthesis and Photochemical Properties of Aluminum, Gallium, and Tin Naphthalocyanies*, Ford, W. E., et al., Am. Chem. Soc., Inorganic Chemistry, vol. 31, No. 16, 1992, pp. 3371–3378, no month available.

*Near IR–Readable Printing Inks*, Takimoto, H. Chem. Abstracts vol. 110, 1989, p. 118, no month available.

*Optical Recording Media Comprising a Layer Containing a Metal Naphthalocvyanine*, Seiji, T. et al., Chem. Abstracts vol. 112, 1990, p. 66829, no month available.

*Near–Infrared–Sensitive Blank For Printing Platemaking Using a Laser Beam*, Hiroshi, T. et al., Chem. Abstracts, vol. 112, 1990, p. 66810, no month available.

*Primary Examiner*—Helene Klemanski
*Attorney, Agent, or Firm*—Wolf, Greenfield & Sacks

[57] ABSTRACT

An infrared printing ink. The printing ink can be read with illumination by a near IR light source and an IR detector. The ink includes a pigment, a vehicle, and a solvent. The infrared ink pigment is silicon (IV) 2,3-naphthalocyanine bis(($R_1$)($R_2$)($R_3$)-silyloxide) wherein $R_1$, $R_2$ and $R_3$ are selected from the group, consisting of an alkyl group, at least one aliphatic cyclic group and at least one aromatic ring. The present inks are produced by mixing the pigment with the solvent to form a colorant solution which is then stirred with the vehicle to form an ink paste.

22 Claims, No Drawings

INFRARED PRINTING INK AND METHOD OF MAKING SAME

BACKGROUND OF THE INVENTION

1. Field of the Invention

The present invention relates to offset printing inks and, more particularly, to invisible, infrared offset printing inks and methods of making such inks which, in printed form, can be detected only with the help of suitable infrared light sources.

2. Description of the Prior Art

Infrared (IR) absorbing dyes have numerous applications, such as optical recording systems, thermal writing displays, laser printers, laser filters, infrared photography, medical applications and printing, for example, of bar codes. With regard to printing applications, some of the existing devices exploit the process of fluorescence in which a dye is excited by ultra-violet (UV), visible or near-IR radiation and fluorescence light emitted by the dye material is detected. For example, Andrus et al., in U.S. Pat. No. 5,093,147, disclose a method of providing intelligible markings. This reference teaches a jet printing process used to apply a compatible liquid or viscous substance containing an organic laser dye that is poorly absorptive of radiation in the visible wavelength range of about 400 nm to about 700 nm, and is highly absorptive of radiation in the near-IR wavelength range of about 750 nm to about 900 nm. The dye fluoresces at longer wavelengths in the IR in response to radiation excitation in the near-IR range.

Near IR absorbing dyes have been used in a variety of applications, including optical recording media, printers, displays, filters, infrared photography, photosensing and medical and non-linear optics applications. Typically, it is desirable for the dyes used in these applications to have strong absorption in near-IR at the emission wavelengths of semiconductor lasers, light fastness, and resistance to chemical and thermal damage. It has been reported by Ueno and Yuasa, *Infrared Absorbing Dyes* (1990), that naphthalocyanine derivatives address these requirements and can be used in the above applications. A variety of applications and methods employed to synthesize naphthalocyanines are described by Tai et al., in EP Application No. 0344891, and Itoh et al., in EP patent Application No. 0313943.

Printing inks, including those used to provide intelligible markings, are made from dispersions of pigments, or solutions of dyes, in a carrier vehicle which forms a fluid, paste, or powder to be applied to and dried on a substrate. Inks are typically comprised of four material categories, including: (a) colorants, which include pigments, toners and dyes, to provide the color contrast with the substrate; (b) vehicles, or varnishes, which act as carriers for the colorants during the printing operation, and bind the colorants to the substrate upon drying; (c) solvents, which primarily assist in the formation of the vehicle, and reduce ink viscosity; and (d) additives, which influence the printability, film characteristics, drying speed, and end-use properties. It has been found that, generally, the most important properties of all inks are drying, printability (a function of the rheology of the ink), and color. Printing inks are typically applied in thin films on a wide variety of substrates, such as paper, paperboard, metal sheets and metallic foil, plastic films, and molded plastic articles, textiles, and glass. Generally, there are four broad classes of printing inks, offset lithographic (planographic), letterpress, flexographic, and rotogravure, based on the mechanism of the particular printing process and the rheology of the ink. These inks vary in physical appearance, composition, method of application, and drying mechanism.

There are many types of offset lithographic (planographic) inks, depending upon the press equipment, substrate and applications. Offset lithographic printing typically utilizes a photochemically treated plate, whose image areas accept ink and whose nonimage areas reject ink but accept acidified water (typically referred to as a fountain solution). The printed image is first transferred to a rubber drum (blanket) from the treated plate and is then applied to the substrate. This type of printing is done with water-repellant and acid-resistant paste inks.

An offset lithographic ink should not transfer pigment (bleed) to the acidic fountain solution, depending upon the extent to which the vehicle wets the pigment. Also, although the inks typically have a much higher viscosity than the fountain solution, depending upon the interfacial relationship between the ink and fountain solution, the ink and fountain solution should not be easily emulsified. Additionally, the rheology of the ink should be compatible with the particular type of offset printing machine on which printing is done (for example, sheet-fed or web-fed), particularly with respect to the speed of the process. Other requirements of lithographic inks involve drying properties, and resistance to heat and light.

An offset lithographic ink to be read at an infrared wavelength (between about 780 nm and about 1,800 nm), in the presence of a background of visible light, preferably should have a high extinction ratio at the peak of the absorption wavelength with very little absorption in the visible light wavelengths. The ink should also have physical, mechanical and chemical compatibility with the printing ink base and printing mechanism. It would also be desirable to produce an offset lithographic infrared printing ink which is non-toxic to users and formulators. While many ink formulations exist which strongly absorb IR wavelengths, to date, none address all of the foregoing requirements.

Accordingly, it is an object of the present invention to provide an offset lithographic infrared printing ink having an extinction ratio of at least 20:1 at the peak of the absorption wavelength, and very little absorption in the visible light wavelengths.

It is a further object of the present invention to provide an offset lithographic infrared printing ink having physical, mechanical, and chemical compatibility with the printing ink base and printing mechanism.

SUMMARY OF THE INVENTION

The present invention is directed to an infrared printing ink which includes a colorant, a vehicle, and a solvent. The colorant is silicon (IV) 2,3-naphthalocyanine bis(($R_1$)($R_2$)($R_3$)-silyloxide), which is physically, mechanically, and chemically compatible with any standard offset lithographic ink base (vehicle). $R_1$, $R_2$, and $R_3$ are selected from the group consisting of an alkyl group, at least one aliphatic cyclic ring and at least one aromatic ring. Preferably, the colorant used in the present inks is silicon (IV) 2,3-naphthalocyanine bis(trihexyl-silyloxide). The solvent is selected from the group consisting of hexane, tetrachloroethylene, toluene, trichloroethylene, phenetol, chlorobenzene, cyclohexanol, pyridine, cyclohexanone, methylethyl ketone, acetone, dimethyl formamide, ethanol, and mixtures thereof. Most preferably, the solvent is cyclohexanone. The infrared printing ink of the present invention may also include an additive. When printed, the present inks are invisible to the unaided eye and can be read only with the help of infrared sources of light.

The inks of the present invention are prepared by initially mixing a powdered pigment, silicon (IV) 2,3-naphthalocyanine bis(($R_1$)($R_2$)($R_3$)-silyloxide), with a solvent and a vehicle to form an ink paste. $R_1$, $R_2$ and $R_3$ are selected from the group consisting of an alkyl group, at least one aliphatic cycling ring and at least one aromatic ring. Preferably, the pigment used is silicon (IV) 2,3-napthalocyanine bis(trihexyl-silyloxide), and the solvent is cyclohexanone. In addition, an additive, such as linseed oil, may be included to enhance the theological properties of the ink. Moreover, the colorant solution formed may be processed in a roller mill, or the like, to reduce the pigment particle size to allow the ink to be used efficiently in a standard printing process.

The present inks are preferably used in an offset printing machine due to the high print quality, registration, and the uniform thickness of the ink on the printed object. The present inks can also be formulated for use with other printing devices and methods, such as letterpress, flexographic, and rotogravure on any substrate surface which can be printed upon.

Other features of the present invention will become apparent from the following detailed description.

DETAILED DESCRIPTION

The present invention is directed to infrared printing inks, and the method of manufacturing the inks, which include a colorant, a vehicle, and a solvent.

The colorant used in the present ink formulations is silicon (IV) 2,3-naphthalocyanine bis( ($R_1$) ($R_2$) ($R_3$)-silyloxide) where $R_1$, $R_2$ and $R_3$ are selected from the group consisting of an alkyl group at least one cyclic aliphatic ring and at least one aromatic ring. This colorant is preferably silicon (IV) 2,3-naphthalocyanine bis(trihexyl-silyloxide) available in powder form from Aldrich Chemical Co., Milwaukee, Wis. This material, first synthesized and described by Wheeler et al., J. Am. Chem. Soc, 1984, 106, 7404–7410, incorporated herein by reference, is a green-colored powder having a melting point of about 278° C. The pigment is stable and soluble in a wide variety of organic solvents, particularly non-polar solvents. As shown below, the compound consists of a π-conjugated naphthalocyanine ring with $D_{4h}$ symmetry, silicon being at the center and in the plane of the ring.

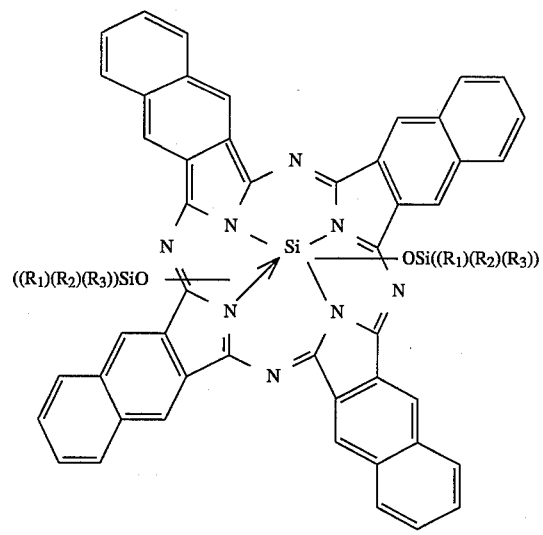

The availability of two bonding electrons above and below the naphthalocyanine plane allow the attachment of bulky substituents. The compound preferably includes two ligands, OSi(($R_1$)($R_2$)($R_3$)), wherein $R_1$, $R_2$, and $R_3$ are selected from the group consisting of an alkyl group, at least one aliphatic cylic ring and at least one aromatic ring. These ligands are attached to the central silicon atom and normal to the naphthalocyanine plane. Preferably, $R_1$, $R_2$, and $R_3$ are capable of producing steric hindrance since it is believed that steric hindrance increases the solubility of the compound in various organic solvents.

The groups $R_1$, $R_2$ and $R_3$ can be n-alkyl groups, provided that the number of carbon atoms in the group creates a steric hindrance. Preferably, these groups contain between 1 and 12 carbon atoms. More preferably, these groups all have the same number of carbon atoms. Most preferably, these groups all are hexyl groups. The groups $R_1$, $R_2$ and $R_3$ can also be branched alkyl groups, provided that the number of carbon atoms in the group creates a steric hindrance. Preferably, these groups contain between 1 and 12 carbon atoms. Most preferably, these groups all contain the same number of carbon atoms. The groups $R_1$, $R_2$ and $R_3$ can also be at least one aliphatic cyclic group, provided that the number of rings creates a steric hindrance. Preferably, the groups are aliphatic cyclic rings with 5 to 7 carbon atoms. The groups $R_1$, $R_2$ and $R_3$ can also be at least one aromatic ring, provided that the the number of rings creates a steric hindrance. It is believed that the aromatic rings may be substituted provided that the substituents create a steric hinderance.

The solvent used in the present infrared inks is selected from the group consisting of hexane, tetrachloroethylene, toluene, trichloroethylene, phenetol, chlorobenzene, cyclohexanol, pyridine, cyclohexanone, methylethyl ketone, acetone, dimethyl formamide, ethanol, and mixtures thereof. Most preferably, the solvent is cyclohexanone, available from Crescent Chemical Co., Hauppauge, N.Y., because the pigment has been found to be soluble in it, and the solvent has been used in other ink formulations (flexographic).

An additive can also be included in the ink formulation to enhance the rheological properties, including the ink paste viscosity. Such additives are generally known in the art, and include oils with high concentrations of glycerides, such as linseed oil and tung oil, available, for example, from Penta Manufacturing. These, and other types of additives, are generally known as drying oils because they can control the rate of solvent evaporation.

The present printing inks are prepared by mixing the powdered pigment, for example, silicon (IV) 2,3-naphthalocyanine bis(trihexyl-silyloxide) in a solvent to form a colorant solution. It is noted that the effectiveness of a pigment depends on its optical properties, such as absorption, reflection and scattering, and on the particle size and size distribution of the pigment within the paste. Fairly dispersed particles of sub-micron sizes are desirable for most printing processes. Even if the primary size of the pigment particles is smaller than the desirable level, they tend to form agglomerates due to various attractive forces exhibited by the particles during Brownjan diffusion. The extent of the agglomeration varies with the nature of the pigment. The particle size of the agglomerates is typically reduced by grinding the colorant solution. Usually, the pigment agglomerates are reduced to a particle size of from about 5.0 to about 7.0 microns by this grinding process.

An ink paste is formed by adding and mixing the colorant solution with an ink vehicle, such as Offset Basic Pentone Tint Base, available from Beacon Printing Corporation, Somerville, Mass. As noted above, a small amount of an additive may be included to reduce the ink paste viscosity.

The inks of the present invention can be used in a variety of applications, such as to prepare a surface having a prerecorded pattern of optically readable pixels containing encoded location information. An optical source, such as a semiconductor laser or light-emitting diode, can illuminate the printed pattern in the range of absorption of the ink. Preferably, the optical source is a gallium aluminum arsenide (GaAlAs) semiconductor laser diode which emits in the absorption wavelength of the ink between about 780 nm and about 800 nm. The reflected radiation may be detected by a silicon photodiode detector having sensitivity in the ink's absorption range. This particular end use application is disclosed in co-pending U.S. patent application Ser. No. 08/273,396, filed on Jul. 11, 1994, which is incorporated herein by reference. The reflected radiation may also be detected by a video camera, which provides an image of the pixels, as disclosed in co-pending U.S. patent application Ser. No. 08/388,025, filed concurrently herewith, which is hereby incorporated by reference.

The present invention is further illustrated by the following examples, which are intended to be illustrative in nature and are not to be construed as limiting the scope of the invention.

EXAMPLE I

The preparation and performance of an infrared printing ink of the present invention was examined.

The ink was formulated with the following composition.

| Ink Component | Quantity |
| --- | --- |
| 1. Pigment, silicon (IV) 2,3-naphthalocyanine bis(trihexyl-silyloxide), powder (Aldrich) | 300 mg |
| 2. Solvent, Cyclohexanone (Crescent) | 0.25 ml |
| 3. Additive, Linseed oil (Penta) | 0.25 ml |
| 4. Vehicle, Offset Basic Pentone Tint Base (Beacon) | 20 ml |

The pigment was mixed and ground with the solvent for 5 minutes, and linseed oil was then added to the colorant solution. This mixture was then ground for ten minutes. Finally, the ink base was added, and the paste was stirred for fifteen minutes. All steps were carried out at 30° C.

A dark green colored ink paste was produced. However, the ink is invisible when printed on white paper in thin layers. The finished ink paste had a viscosity which was close to that of the ink base (vehicle) due to the relatively small amounts of pigment, solvent and additive in the ink paste. Other ink properties were examined, including the dispersion, thickness, reflection, and absorption, as reported below.

Dispersion Properties

The extent of dispersion of the ink was determined by optical microscopy. With the minimum detectable particle sizes of up to 0.5 micron, the size distribution was obtained by placing a drop of the ink paste on a clear glass slide, and using a standard dispersion as a reference. Under an optical microscope the dispersion obtained by this method was observed to be reasonably good. Then the ink prepared was used to print a code comprising small and big dots on various types of papers and transparent slides for a photocopier, on a sheet-fed offset printer. The encoded papers and transparent slides formed included dots which were square shaped, with each side equal to about 150 microns for small dots and about 450 microns for bigger ones. The visibility was reduced by using green tinted paper, using other colorants in small amounts, and by mixing a controlled amount of an opaque white pigment such as titanium oxide or zinc oxide to the ink paste. The use of opaque white pigment diminished the contrast in the reading process by IR radiation because it also reflects near-IR light. Thus, the requirement. Inks were examined with silicon (IV) 2,3-naphthalocyanine bis(trihexyl-silyloxide) and titanium dioxide pigments, and the printouts were much more invisible.

Thickness

The thickness, d, of the printed film was determined by passing light through the film deposited on a thin transparent slide. The transmission spectrum of the transparency comprises the interference pattern characteristic of very thin films. If there are n fringes in a range Δv of wave numbers, the thickness, d, of the film is given by $$d = n/(2\Delta v).$$

The thickness calculated from this technique was 3.5 mm. This determines the amount of the pigment needed for a given transmission requirement.

Reflection

The reflection of the present inks was determined by passing the light from a tungsten lamp, filtered through a monochromator, reflected from a printed paper, and detected by a silicon detector through a lock-in amplifier as a function of wavelength. The reflection minimum is observed at 790 nm. This was confirmed by repeating the same experiment with the printed transparent slide in transmission mode, in which case the absorption maximum in the thin film is observed at 790 nm. The absorption maximum is red shifted and considerably broadened in thin film compared to the solution.

The encoded papers were then tested with an optical "pen", as described in co-pending U.S. patent application Ser. Nos. 08/273,396, filed Jul. 11, 1994, and 08/338,025, filed concurrently herewith, both of which are incorporated herein by reference, with illumination by 790 nm LED's, available as product number IRED HE7601SG from Hitachi America Ltd., Brisbane, Calif. The nearly invisible code was highly readable.

Absorption

The ink is well absorbed and adhered well to the various types of papers tested. The light fastness of the present inks was excellent, and the readability of the printed paper was not affected after continuous exposure to intense light for several hours.

The absorption spectrum of the present inks was evaluated in solution form using many different solvents, and the absorption and reflection properties of the thin films of the pigment in an ink base was also tested. The thin films were prepared by lithographic printing on smooth surfaced offset paper and on a transparency film for a plain paper copier.

The pigment's spectrum exhibits a strong absorption peak in near-IR and low activity in the visible wavelength range. The spectra in various other solvents are similar, exhibiting a slight shift of the peak absorption wavelength from solvent to solvent which can be explained on the basis of semi-empirical models in terms of the refractive index and dielectric constant of the solvents (as described in EXAMPLE II). It can be concluded from spectra of the present pigment on glass slides that the compound is chemically stable against the ingredients of the present ink base as it preserves its optical properties.

The molar absorption coefficient at the peak of the strongest of the Q-band absorption is calculated from this spectrum to be $8.5 \times 10^5$ liter mole$^{-1}$ cm$^{-1}$. From this the concentration of the solution can be determined which allows a specific percentage of the incident light to pass through a given thickness of a sample and absorb the rest by using the following relationship derived from Beer's law:

$$\rho = -(1/\epsilon L) ln(T)$$

where $\rho$ is concentration in mole liter$^{-1}$ (the concentration in mg/ml will be denoted by the letter c), $\epsilon$ is molar absorption coefficient in liter mole$^{-1}$ cm$^{-1}$, L is the thickness of the sample, and T is the transmission in single pass. For example, if $\epsilon = 8.5 \times 10^5$ liter mole$^{-1}$ cm$^{-1}$, L=3 μm, and T=10% then c=11.7 mg/ml. A concentration of 15 mg/ml was used in the printing experiments.

EXAMPLE II

The effect of various solvents on the position of the near-IR Q-band electronic absorption band in silicon (IV) 2,3-naphthalocyanine bis(trihexyl-silyloxide) was examined. The position of the strongest absorption peak of Q-band was recorded as described below. The procedure used to determine the effect of various solvents on the pigment is described as follows. Light from a tungsten lamp is directed upon a sample through a chopper. The transmitted light is focused as it is passed through a monochromator and is detected by a single element Si-detector. The detector converts the radiant energy into an electric signal output. The output of the detector is then passed through a lock-in amplifier which, together with chopper, improves the signal-to-noise ratio and provides the required amplification. A concave holographic grating with 1200 grooves/mm was used in the monochromator, which gives a spectral range of 300–850 nm. The grating is blazed at 450 nm in second order. The wavelength accuracy is 1 nm. The monochromator is operated by a stepper motor controlled through a computer. The Si-detector has a fairly flat response in the spectral region of interest.

The solution samples were prepared as described in EXAMPLE I, and were placed in optical glass cuvettes with a path length of 1 mm. A solid thin film was formed with an offset printing mechanism. The ink was applied with an offset printer to print a 1"×1" square spot on a glossy offset paper for an evaluation of its reflection, and on a photocopy transparency for an evaluation of its transmission. The reflection experiment was done by putting the paper at the output of monochromator at 45° and detecting the light reflected.

As noted above, the spectrum is typical of the pigment in all solvents evaluated except for an overall shift in frequency scale between solvents. The positions of the highest absorption peaks of the Q-band in the various solvents evaluated are tabulated in Table 1.

TABLE 1

Position of the Highest Absorption Peak in Q-Band (nm)

| Solvent | λ max (±.05 nm) |
| --- | --- |
| hexane | 764 |
| tetrachloroethylene | 772 |
| toluene | 774 |
| trichloroethylene | 772 |
| phenetol | 774 |
| chlorobenzene | 774 |
| cyclohexanol | 774 |
| pyridine | 778 |
| cyclohexanone | 774 |
| methylethyl ketone | 770 |
| acetone | 770 |
| dimethyl formamide | 776 |
| ethanol | 768 |

The solvent dependence of the shift in absorption band (solvatochromism) is attributed to the change in electronic distribution, i.e., dipole moment, from the ground state to the excited state of the absorbing molecule. For a nonpolar solute (such as the present pigment) in a nonpolar solvent, only dispersion forces (also known as London forces) are active. This causes a small red shift of the absorption band in a solvent of refractive index n, proportional to $(n^2-1)/(2n^2+1)$, in wave numbers. In a polar solvent, however, in addition to the dispersion forces, solvent Stark effect contributes significantly to solvatochromism. The shift in wave numbers is proposed to be proportional to $(\epsilon-1)(2\epsilon+1)/\epsilon$, where $\epsilon$ is the dielectric cortstant of the solvent. These shifts are measured with respect to the vapor phase absorption which is not available for the present pigment. The position of the Q-band in vapor phase and the proportionality constant for nonpolar solvents were then calculated from experimental spectra in hexane and toluene. The proportionality constant for Stark effect was 4252.0, and was derived from spectrum in acetone. The following results were obtained which were then used to compute shifts in other solvents as tabulated in Table 2.

TABLE 2

Experimental and Calculated Spectral Shifts of the Q-Band Absorption Peak Frequency (Wavenumbers)

| Solvent | n | ε | Δν (exp.) | Δν calc. Dispersion | Δ calc. Stark |
| --- | --- | --- | --- | --- | --- |
| hexane | 1.38 | 1.88 | 800 | 799 | 6.7 |
| tetrachloroethylene | 1.51 | 2.3 | 935.1 | 978.9 | 6.3 |
| toluene | 1.5 | 2.38 | 969 | 965 | 6.7 |
| trichloroethylene | 1.48 | 3.42 | 935.1 | 940.7 | 11.1 |
| phenetol | 1.51 | 4.22 | 968.6 | 978.9 | 14.4 |
| chlorobenzene | 1.53 | 5.62 | 968.6 | 1,003.5 | 20.1 |
| cyclohexanol | 1.47 | 9.0 | 968.6 | 927.5 | 33.8 |
| pyridine | 1.51 | 12.4 | 1,035 | 978.9 | 47.5 |

TABLE 2-continued

Experimental and Calculated Spectral Shifts of the
Q-Band Absorption Peak Frequency (Wavenumbers)

| Solvent | n | ε | Δν (exp.) | Δν calc. Dispersion | Δ calc. Stark |
|---|---|---|---|---|---|
| cyclohexanone | 1.45 | 18.3 | 969 | 900.6 | 71.1 |
| methylethyl ketone | 1.38 | 18.5 | 902 | 799.7 | 71.9 |
| acetone | 1.36 | 20.7 | 902 | 768.7 | 80.7 |
| dimethyl formamide | 1.43 | 37.0 | 1,002 | 872.9 | 145.9 |
| ethanol | 1.36 | 24.6 | 867.7 | 768.7 | 96.3 |

The position of the highest absorption peak of Q-band in vapor phase at 720 nm (with a proportionality constant equal to 4252.0) was calculated as follows:

For nonpolar solvents:

$$\Delta\nu = 4252 \, (n^2-1)/(2n^2+1) \quad (1)$$

For polar solvents:

$$\Delta\nu = 4252 \, (n^2-1)/(2n^2+1) + 2(\epsilon-1)(2\epsilon+1)/\epsilon \quad (2)$$

Solvents having a small dielectric constant (nonpolar) exhibit a small or negligible Stark effect, while polar solvents have an appreciable effect. As is apparent from Table 2, the correlation between the values of experimental and calculated shifts is good, confirming the validity of the theory used for predicting shifts in solvents.

The solvatochromic shifts, and the position of the highest absorption peak of the Q-band electronic transition for silicon 2,3-naphthalocyanine bis(trihexyl-silyloxide) in various solvents illustrates that the shifts in nonpolar solvents is due to dispersion forces and depends on the refractive index of the solvent. In polar solvents, in addition to the dispersion effect, the Stark effect (which depends on the dielectric constant of the solvent) accounts for the shift.

Although particular embodiments of the invention have been described in detail for purposes of illustration, various modifications may be made without departing from the spirit and scope of the present invention. Design considerations may alter the method of making the present infrared inks, or the type and/or ratio of pigment additives to optimize the efficiency of certain applications and minimize the cost associated with the production and use of the inks. Accordingly, this invention is not to be limited except by the appended claims.

What is claimed is:

1. An infrared printing ink, comprising:
   a colorant;
   a vehicle; and
   a solvent,
   wherein said colorant is silicon (IV) 2,3-naphthalocyanine bis(($R_1$)($R_2$)($R_3$)-silyloxide) and $R_1$, $R_2$, and $R_3$ are selected from the group consisting of an alkyl group, at least one aliphatic cyclic ring, and at least one aromatic ring.

2. The infrared printing ink as claimed in claim 1, wherein $R_1$, $R_2$, and $R_3$ are n-alkyl groups.

3. The infrared printing ink as claimed in claim 2, wherein $R_1$, $R_2$, and $R_3$ are n-alkyl groups with 1–12 carbon atoms.

4. The infrared printing ink as claimed in claim 3, wherein $R_1$, $R_2$, and $R_3$ are identical.

5. The infrared printing ink as claimed in claim 4, wherein $R_1$, $R_2$, and $R_3$ are all hexyl groups.

6. The infrared printing ink as claimed in claim 1 wherein $R_1$, $R_2$ and $R_3$ are branched alkyl groups.

7. The infrared printing ink as claimed in claim 6 wherein $R_1$, $R_2$ and $R_3$ are branched alkyl groups with 1–12 carbon atoms.

8. The infrared printing ink as claimed in claim 7 wherein $R_1$, $R_2$ and $R_3$ are identical.

9. The infrared printing ink as claimed in claim 1, wherein $R_1$, $R_2$ and $R_3$ are aliphatic cyclic rings.

10. The infrared printing ink as claimed in claim 9 wherein $R_1$, $R_2$ and $R_3$ are aliphatic cyclic rings with 5 to 7 carbon atoms.

11. The infrared printing ink as claimed in claim 1 wherein $R_1$, $R_2$ and $R_3$ are aromatic rings.

12. The infrared printing ink as claimed in claim 1 wherein said solvent is selected from the group consisting of hexane, tetrachloroethylene, toluene, trichlorethylene, phenetol, chlorobenzene, cyclohexanol, pyridine, cyclohexanone, methylethylketone, acetone, dimethylformamide, ethanol, and mixtures thereof.

13. The infrared printing ink as claimed in claim 12 wherein said solvent is cyclohexanone.

14. The infrared printing ink as claimed in claim 1, wherein said ink further comprises an additive.

15. The infrared printing ink as claimed in claim 14, wherein said additive is linseed oil.

16. The infrared printing ink as claimed in claim 1, wherein said ink is an offset lithographic ink.

17. A method of making an infrared printing ink, comprising:
   mixing a colorant in a solvent to form a colorant solution; and
   adding said colorant solution to a vehicle to form an ink paste;
   wherein said colorant is silicon (IV) 2,3-naphthalocyanine bis(($R_1$)($R_2$)($R_3$)-silyloxide), and $R_1$, $R_2$ and $R_3$ are selected from the group consisting of an alkyl group, at least one aliphatic cyclic ring, and at least one aromatic ring.

18. The method of claim 17, wherein said colorant is silicon (IV) 2,3-naphthalocyanine bis(trihexyl-silyloxide).

19. The method of claim 17, wherein said solvent is selected from the group consisting of hexane, tetrachloroethylene, toluene, trichlorethylene, phenetol, chlorobenzene, cyclohexanol, pyridine, cyclohexanone, methylethylketone, acetone, dimethylformamide, ethanol, and mixtures thereof.

20. The method of claim 19, wherein said solvent is cyclohexanone.

21. The method of claim 17, further comprising the step of mixing an additive in said ink paste.

22. The method of claim 21, wherein said additive is linseed oil.

* * * * *